July 14, 1959 K. ONDER 2,895,018

HIGH FIDELITY PUSH-PULL AMPLIFIERS

Filed Jan. 6, 1954 2 Sheets-Sheet 1

INVENTOR.
KERIM ONDER
BY Arthur L. Tirico
ATTORNEY

INVENTOR.
KERIM ONDER
BY Arthur L Tirico
ATTORNEY 2,895,018

HIGH FIDELITY PUSH-PULL AMPLIFIERS

Kerim Onder, New York, N.Y., assignor of fifteen one-hundredths to Arthur L. Tirico, Glen Ridge, N.J.

Application January 6, 1954, Serial No. 402,443

6 Claims. (Cl. 179—171)

Figure 1:
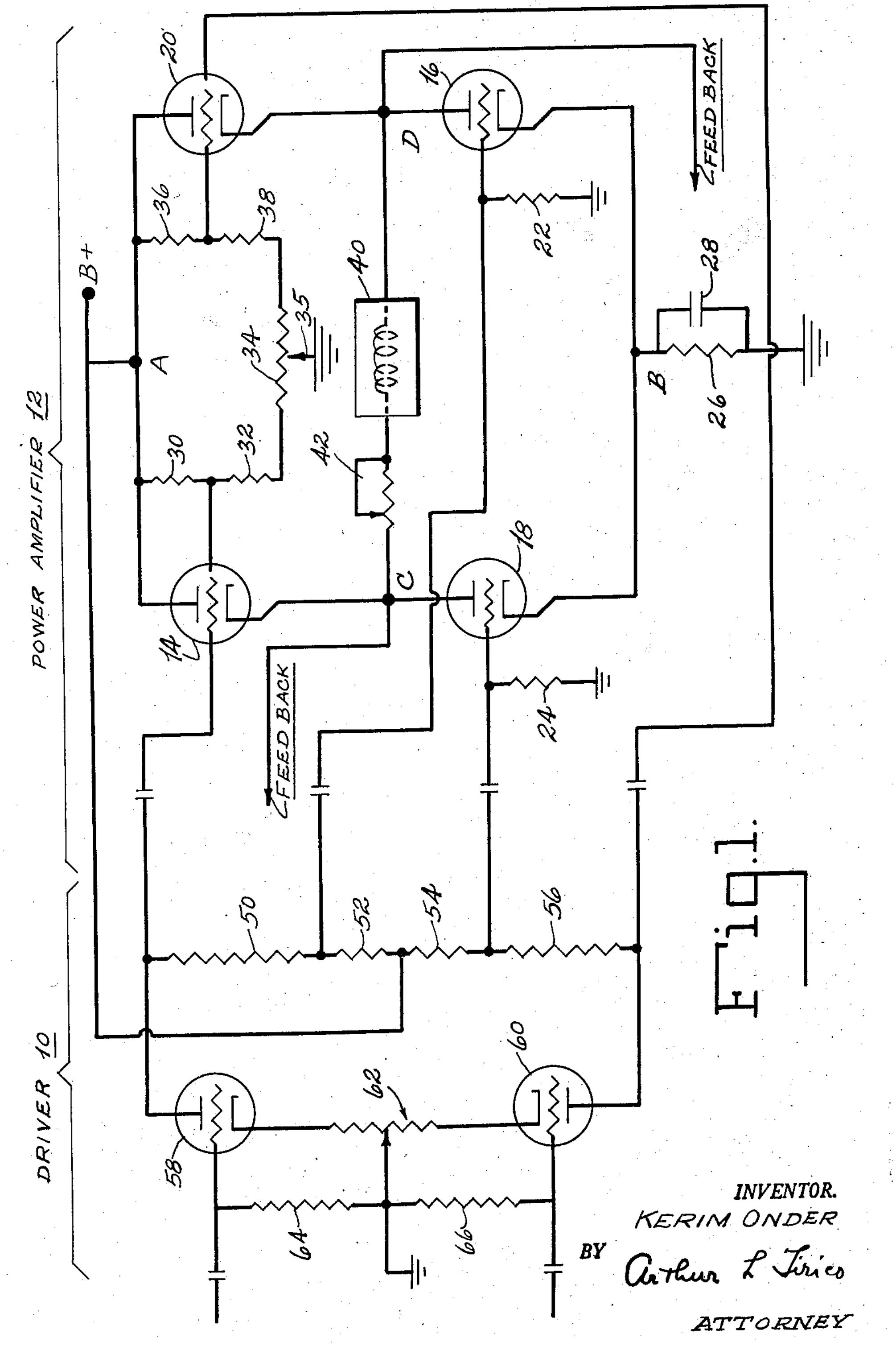

This invention relates to electrical apparatus. More particularly it relates to an amplifier, such as an audio amplifier, which requires neither an output transformer to efficiently drive a low impedance load with a minimum of distortion nor such a transformer or any blocking condenser(s) to keep a D.C. component from flowing through the load from the output(s) of the amplifying device(s).

As is known transformers are used in power amplifiers for impedance transformation whereby maximum power may be delivered to a given load and to isolate the load from direct current components in the circuit. An ideal transformer should perform these functions without introducing any distortion and power loss. However, in practice audio transformers are invariably very far from ideal in these respects despite the fact that, as is only too well known, they constitute the most costly, heavy and bulky items used in audio amplifiers.

This introduction of distortion is unavoidable since the reactive elements and saturable cores used in transformers cause them to have impedances which vary both with frequency and operating level or excitation.

Amplitude distortion will be caused due to the non-linearity of the B—H characteristics of the core material and will become worse at low frequencies.

As is known the frequency distortion attributable to the use of output transformers derives to a considerable extent from such factors as their unavoidably having substantial amounts of leakage inductance and inter-winding capacitance. In addition, of course, resonance effects are also likely to occur at certain frequencies.

The frequency distortion is invariably accompanied by phase distortion which can constitute a serious complication where feedback is applied around a loop including the output transformer. At certain frequencies such a loop will be prone not to meet minimum stability requirements of incurring no more than a safety margin of say 30 degrees of variation in phase shift for a 15 decibel loss around the loop. Moreover very often such a feedback amplifier which may appear to be stable under certain steady conditions will not be so under transient conditions, i.e., it will be quite unstable when subjected to the "Tone Burst" method of testing.

The efficiency of an audio output transformer is often overlooked. However, there are commercial transformers in which the losses including the total core and copper losses may be as high as 50%, the former, in addition, being a variable which is dependent both on frequency and flux density. As a result of this, the frequency response of an amplifier using an output transformer will be quite different at various power levels.

Furthermore in the case of push-pull output transformers there is the problem of attaining various kinds of symmetry such as symmetry of coupling between the two halves of the primary and the secondary(ies). Unless a coupling factor of one is realized, the flux due to the D.C. components cannot be completely cancelled out even if A.C. symmetry should be attained. This is of particular importance in class B audio amplifiers as is well known.

For these and other reasons the output transformer is likely to be the component of an audio amplifier which most adversely affects its fidelity even if it is designed with virtually no regard for cost, weight, and size.

Accordingly it is an object of this invention to devise improvements in amplifiers to eliminate the output transformer altogether.

It is another object of this invention to devise a transformerless amplifier in which it is not necessary to use any condenser(s) to block D.C. components from passing into the load from the amplifier.

Other objects are to devise a transformerless amplifier which has a relatively low output impedance and in which inverse feedback can be easily applied without using complicated circuitry or adversely affecting stability.

In general these and other objects are attained by combining (1) a power amplifier circuit, which is: (*a*) of symmetrical bridge configuration; (*b*) includes amplifying devices, e.g., tubes, but no impedances other than the internal impedances of the devices, in all of its four sides; (*c*) receives its D.C. energization over one pair of its opposite corners which in the present example are designated its top and bottom corners, A and B respectively; and (*d*) delivers its A.C. output power over the other pair herein designated its side corners, C and D, with (2) a split phase driving circuit including voltage dividing means in its two sides whereby it can supply four discrete voltages for differently actuating the amplifying devices contained in the four sides of the bridge, the two voltages coming from each side of the phase splitter being in phase as to each other but opposite in phase as to those coming from the other side and the magnitudes of each pair of in-phase voltages being appropriately unequal so that when the larger and smaller ones thereof are individually applied to amplifying devices respectively located in an upper and a lower side of the bridge-circuit those devices will be substantially equally driven despite the fact that only one of them has a stable D.C. bias whereas the bias of the other includes a component which fluctuates in accordance with signal currents moving in the bridge.

Figure 2:
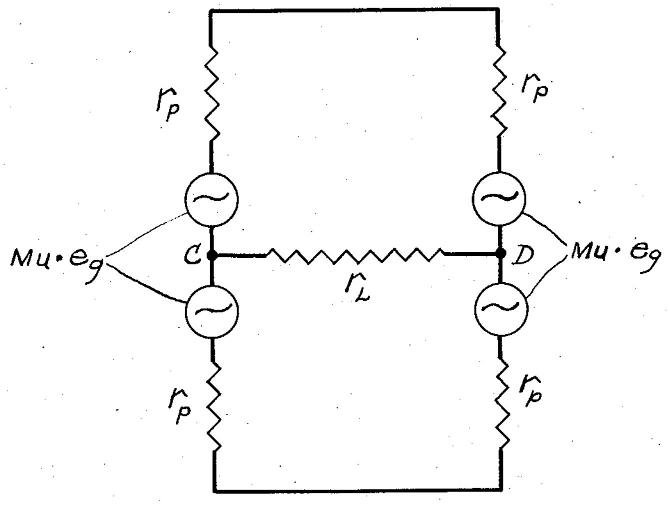
Figure 3:
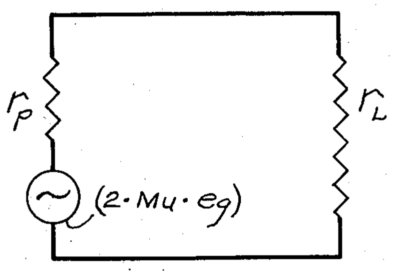

In the drawing:

Fig. 1 is a schematic representation of an embodiment of the present invention; and Figs. 2 and 3 are equivalent circuits representing simplified versions of the effective nature of the power amplifier portion of the Fig. 1 embodiment.

The two principal portions of the apparatus shown in Fig. 1 are a driver 10, which in the example shown is a resistance coupled push-pull voltage amplifier, and a power amplifier 12. The amplifier 12 is a bridge type of circuit having "top" and "bottom" corners A and B respectively; "side" corners C and D; and "sides" or "legs" AC, CB, BD, and DA which interconnect the corners as shown in Fig. 1. Four amplifying devices 14, 16, 18 and 20 are respectively connected serially within the four sides of the bridge circuit. These devices have similar operating characteristics and are so biased and driven that each of them delivers equal power to the load. A number of audio amplifiers which I built to embody this invention and in which I used dual triodes of a readily available type (6AS7–GT's) to provide amplifying devices having low plate resistances (circa 250 ohms), afforded exact impedance matches with 250 ohm loud speakers and in fact performed outstandingly well, insofar as could be adjudged subjectively as to loudness and fidelity-of-reproduction, with all kinds of the most widely used speakers including a number having voice coil impedances as low as four ohms.

In the present example biasing for the devices in the lower sides of the bridge is provided by grounding their control grids over high resistances 22, 24 while a cathode resistor, 26, is in series with their common ground return, i.e., is connected between the bottom corner B and ground, the resistor 26 being by-passed for signal current components by a capacitor 28. As will be apparent the direct potential of the cathode of the device (14 or 16) in each of the upper sides (AC or AD) of the bridge will be raised above the biasing potential of the cathode of the device (18 or 16) in the side (CB or BD) over which it is serially connected with the bottom corner, B, due to the $i_p \cdot r_p$ drop across the latter. Accordingly a high resistance ("bleeder") network is provided (30, 32 and left portion of 34 for the devices 14 and 36, 38 and right portion of 34 for the device 20) to raise the direct potential of its grid by an equal amount to thereby cause the value of its grid-to-cathode bias to be equal to that of said device (18 or 16) in the side beneath it. By providing a common ground return for the two bleeder networks over a tap 35 which is movable intermediate the ends of the resistor 34 a means is afforded for oppositely adjusting the biases of the upper devices 14, 20, and thereby their effective plate resistances to equalize the direct potentials of the corners C and D and thereby eliminate any tendency for the bridge to force a direct current component through a load 40 which is connected to the bridge between these points. While this means normally should be so adjusted initially, i.e., when the circuit is first assembled, and while it may even be slightly advantageous to repeat the adjustment whenever important components such as tubes are replaced, one of the features of the present invention is that neither such repeated adjustments nor even the use of matched tube-pairs as replacements are really necessary inasmuch as certain interactions which take place between tubes in the bridge tend automatically to reduce to a minimum the unbalanced condition(s) most likely to produce a direct potential difference between the output corners. One such condition exists when there are unequal $i_p \cdot r_p$ drops across the amplifying devices respectively positioned above and below one of the output ("side") corners, e.g., the $i_p \cdot r_p$ drops across the devices 14 and 18. Fortunately, whenever this condition tends to arise the circuit itself acts to oppose it due to the fact that the bias of the upper device, and (therefore) its D.C. plate resistance, depend on how equally the B+ voltage is divided between its own plate resistance and that of the device below it, and, as will be apparent from a close study of the circuit, these parameters of the upper device will automatically change in the correct direction to oppose the initial tendency towards inequality in its $i_p \cdot r_p$ drop and that of the device below it.

If desired the bleeder networks 30—34 and 34—38 can be dispensed with by using direct-coupling, instead of condenser-coupling, between the driver 10 and the grids of the upper devices 14, 20 provided such circuit constants are used in the driver that the anodes of its push-pull tubes are at the same direct potentials as are desired for said grids. Where this is done adjustments like those which would have been made possible by use of the common elements 34, 35 of the bleeder networks may be made available by including in the driver a means, such as one to be described below, for adjusting the relative values of the D.C. plate resistances and hence of the anode potentials of the driver tubes and thereby the relative potentials of the grids of the upper devices 14 and 20.

Since in the operation of this apparatus the potential of the cathode of each upper tube (14 or 20) will be constantly changing in accordance with the output signal being developed at the anode of the tube (18 or 16) below it, it will be necessary, if that upper tube is to contribute its equal share of power to the load, to drive it with a signal whose magnitude is larger than the magnitude of the input signal which is applied to said lower tube by a factor proportional to the gain thereof. I have found that the nature of the function in question depends on the ratio of the impedance of the load to the plate resistance of the tubes 14, 16, 18, 20 and that for the value of said ratio (1/1) which is optimum insofar as maximum power transfer is concerned, it is:

$$e_{\text{upper drive}} = e_{\text{lower drive}} + 1/2 e_{\text{across the load}}$$

Because of this, if, in an apparatus of this kind, an ideal load having an impedance equal to $r_p$ is replaced by another having a substantially different impedance, the result will be to adversely affect not only the efficiency of the circuit in its total transfer of power from the tubes 14, 16, 18 and 20 to the load, but also the exactness with which it is effective to cause these tubes to contribute equally to that power. Accordingly if desired provision may be made for connecting any load 40 which is of lower impedance than the plate resistance of the tubes to the corners C, D over a variable series resistance, like that shown at 42 in Fig. 1, and, if desired, the various possible adjustments of this resistance may be calibrated directly in load impedance values. For example, if the value of a resistance 42 is, say, 150 ohms and the $r_p$ of the tubes is 250 ohms, the adjustment in which its movable tap is at its zero impedance end, i.e., its left end in the drawing, may be calibrated as being suitable for a 250 ohm load; the adjustment in which the tap is at its opposite end may be calibrated as suitable for a 100 ohm load; the adjustment in which the tap is at its midpoint may be calibrated for a 175 ohm load; etc.

Obviously similar provision for assuring equal contributions of power by the tubes of the bridge may also be made for loads of higher impedances than 250 ohms by providing means for shunting the load with appropriate amounts of resistance which, if desired, may be directly calibrated to indicate what load impedances they render suitable.

The driver 10 is a push-pull voltage amplifier which in general may be of a conventional type except for the fact that it employs voltage dividers 50, 52 and 54, 56 to provide the two pairs of oppositely phased drive voltages referred to above. In the example shown herein biases for its amplifier tubes 58, 60 are provided by including appropriate amounts of resistance in their cathode-returns, by suitable means such as that shown at 62, while grounding their control grids over grid resistors 64, 66.

Where condenser coupling is used between the driver 10 and the upper tubes (14, 20) of the power amplifier 12, in embodiments in which the grids of these tubes derive their needed positive polarization from bleeder networks like the networks 30, 32, 34 and 34, 36, 38, the adjustability of the means 62 will be used solely to achieve balanced operation of the driver. However where the coupling to said two tubes of the bridge is direct to the end that such networks may be eliminated, then this means may serve the alternative or added purpose of adjusting the biases of said tubes to eliminate any quiescent potential difference between the bridge's output ("side") corners C, D.

In some of the audio amplifiers mentioned above I used resistors of equal value (68,000 ohms) in each of the voltage dividers 50, 52 and 54, 56.

When a schematic diagram representing a bridge circuit is arranged as in Fig. 1 it turns out that the pair of tubes on each diagonal are driven in the same phase as to each other and in opposite phase to the pair on the other diagonal. It is noted that because of this I have used the term "diagonal phasing" in a number of papers which I have published and presented to describe this amplifier.

Because any phase shift which this circuit will produce on signals passing through it will be uniform over a very wide band of frequencies, strong negative feed back can be very easily provided without any sacrifice of stability, it being possible to make suitable connections for that purpose from a number of points in the amplifier 12, such as from one or both (for push-pull feed back) of its output corners C, D to one or more points in the driver 10 or in an amplifier or pre-amplifier (not shown) which precedes it.

In the Fig. 2 circuit of the amplifier 12 all of the biasing and adjustment-making elements are excluded and each of the tubes 14, 16, 18, 20 is represented as an impedanceless generator which provides a signal of magnitude $Mu \cdot e_g$ and is in series with an external resistance equal to $r_p$. As can be readily demonstrated mathematically, this network can be resolved into the equivalent series-loop circuit of Fig. 3 from which, in turn, it is apparent that the total usefully produced power is four times that which could be obtained from any one of the tubes.

It is to be noted that elimination of the output transformer in the manner disclosed herein not only improves the performance characteristics of the amplifier but also very considerably reduces its weight and size making it particularly suitable for certain types of use, e.g., in airborne electrical apparatus.

Another advantage is that poorly filtered D.C. plate voltage power supplies can be used for energizing the power amplifier without producing any audible D.C. hum in its output.

It is to be understood that while this invention may be employed for totally eliminating output transformers, it can also be used to advantage to obtain much better results, and at much reduced cost, in other embodiments in which transformers are employed, say to more exactly match the output impedance of the bridge to a particularly low impedance load, since these transformers will not need: (1) to carry any D.C. primary current, (2) to be center tapped, or (3) to have high turns ratios. In fact I have used ordinary, inexpensive, small filament transformers with excellent results.

While the circuit disclosed herein may come to be preferred for use in high fidelity audio amplifiers, its usefulness is by no means limited thereto. For example it may serve such other uses as in power video amplifiers and in circuits for magnetically deflecting electron beams, its use in the latter circuits serving to: (1) eliminate any need for center tapping of yoke windings, (2) limit the inductive reactance of the circuit to substantially only that of the yoke itself, and (3) eliminate unwanted direct current from passing through the yoke.

It is to be understood that the hard triodes 14, 16, 18, 20 of the power amplifier 12 are shown herein by way of example only and not of limitation, and that many other suitable types of amplifying devices may be employed in their stead, e.g., transistors, the type of continuously grid-controlled gas amplifier tubes sometimes referred to as "Plasmatrons" and exemplified by those shown in U.S. Patent 2,611,884, saturable-core magnetic amplifiers, etc. and in fact for many purposes embodiments employing such other devices are to be preferred inasmuch as they will have substantially lower output impedances than embodiments employing vacuum tubes in addition to having the desirable characteristics thereof such as freedom from D.C. and (power-line) hum components in their outputs and operativeness over a wide frequency band.

Obviously, many modifications and variations of the invention, as hereinbefore set forth, may be made without departing from the spirit and scope thereof, and therefore only such limitations should be imposed as are indicated in the appended claims.

I claim:

1. Apparatus comprising: a power-amplifier bridge circuit including four matched electron discharge devices each having a similar electrode arrangement including an anode, a cathode, and a control electrode, the anodes of a first pair (14, 20) of said devices and the cathodes of the second pair (18, 16) being respectively connected together to form the top and bottom corners of the bridge circuit, the cathodes of said first pair of devices being connected respectively to the anodes of said second pair to form the opposite side-corners of said bridge circuit, a source of direct energizing potential having its positive and negative terminals respectively connected to said top and bottom corners, means for fixing the operating direct potential of the control electrode of each of the devices of said second pair at a pretetermined level with respect to that of said negative terminal of said source, such as at a ground reference direct potential of zero volts, where said negative terminal is grounded, a load element, and a load circuit connecting said load element between said side corners; and driving means external to said bridge and resistance coupled thereto for feeding said four devices with the same signal in suitable phases and magnitudes with respect to each other for all of them to deliver equal amounts of signal power to said load circuit, said means including an amplifier circuit having a split-phase output which is free of any circuit element having lumped inductive reactance and includes two voltage dividers for respectively deriving from each split-phase one driving voltage of relatively large magnitude and one of relatively small magnitude, and means for individually applying said relatively large magnitude voltages from the respective voltage dividers to the control electrodes of said first pair of devices and said relatively small magnitude voltages therefrom to the control electrodes of said second pair.

2. Apparatus as in claim 1 in which one of said terminals of said source is grounded and further comprising means for providing each of the devices of said second pair with a control electrode-to-cathode bias of a predetermined and relatively constant magnitude and means for providing each of the devices of said first pair with a control electrode-to-ground bias of substantially the magnitude of the sum of the quiescent anode-to-cathode voltage drop across one of said second pair of devices plus said control electrode-to-cathode bias thereof whereby the bridge circuit tends to be self-balancing.

3. Apparatus as in claim 1 in which said load circuit includes means for adjusting the impedance which it presents to said side-corners to a value substantially equal to the internal impedance of one of said devices.

4. Apparatus comprising: a power-amplifier bridge circuit including four matched variable impedance amplifying devices each having a similar electrode arrangement including first and second work-electrodes between which a direct current passes in the operation of the device from the first work-electrode to the second, and a control electrode for modulating said current in accordance with a signal input, the first work-electrodes of a first pair (14, 20) of said devices and the second work-electrodes of the second pair (18, 16) being respectively connected together to form the top and bottom corners of the bridge circuit, the second work-electrodes of said first pair of devices being connected respectively to the first work-electrodes of said second pair to form the opposite side-corners of said bridge circuit, a source of direct energizing potential having its positive and negative terminals respectively connected to said top and bottom corners, means for fixing the operating direct potential of the control electrode of each of said devices of said second pair with respect to said negative terminal of said source, a load element, and a load circuit connecting said load element between said side-corners; and driving means external to said bridge and resistance coupled thereto for feeding said four devices with the same signal input in suitable phases and magnitudes with respect to each other to cause them to deliver equal amounts of signal power to said load circuit, said means including an amplifier circuit having a split-phase output which is free of any circuit element having lumped inductive reactance and includes two voltage dividers for respectively deriving from each split-phase one driving voltage of a relatively large magnitude and one of a relatively small magnitude, and means for individually applying the relatively large magnitude voltages from the respective voltage dividers to the control electrodes of said first pair of devices and said relatively small magnitude voltages therefrom to the respective control electrodes of said second pair.

5. Apparatus as in claim 4 in which at least one of said side-corners constitutes the output terminal of a negative feed-back circuit.

6. Apparatus as in claim 4 in which said means for applying signal voltages of large and small magnitudes to said control electrodes from said voltage dividers includes direct couplings therefrom to the control electrodes of said first pair of devices for also applying biasing voltages thereto from the driving means and said driving means also includes means for adjusting the relative values of said biasing voltages under a condition of no-signal input to balance the bridge circuit as to direct current flow.

References Cited in the file of this patent

UNITED STATES PATENTS

| | | |
|---|---|---|
| 2,235,677 | Gubin | Mar. 18, 1941 |
| 2,428,295 | Scantlebury | Sept. 30, 1947 |
| 2,590,104 | King | Mar. 25, 1952 |
| 2,631,198 | Parisoe | Mar. 10, 1953 |